May 28, 1935.   A. E. BENSON   2,002,687

TIRE BUILDING DRUM

Filed Oct. 11, 1933

INVENTOR.
ARTHUR E. BENSON
BY
Chapin & Neal
ATTORNEY.

Patented May 28, 1935

2,002,687

UNITED STATES PATENT OFFICE 2,002,687

TIRE BUILDING DRUM

Arthur E. Benson, Indian Orchard, Mass., assignor to The Fisk Rubber Corporation, Chicopee Falls, Mass., a corporation of Delaware Application October 11, 1933, Serial No. 693,185

2 Claims. (Cl. 154—9)

This invention relates to annular tire building drums of the semi-flat type; that is, to drums in which the portion between the bead receiving portions has a radius greater than the bead radius but less than the crown radius of the completely shaped tires.

The object of the invention is to provide a drum of the semi-flat type affording more uniform building conditions and greater facility in shaping the carcass material to the drum. These and further objects will be more specifically disclosed in the following specification and claims.

In the accompanying drawing, which illustrates one embodiment of the invention,

Figure 1:
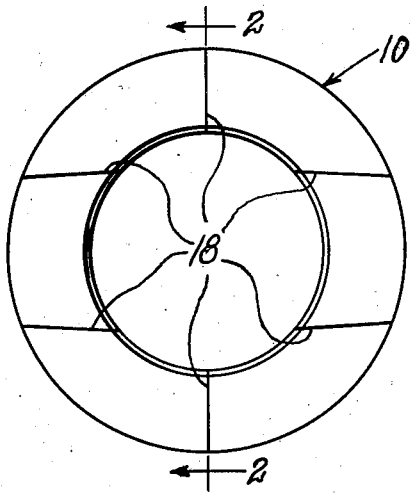
Fig. 1 is a side elevation of a building drum according to the invention.
Figure 2:
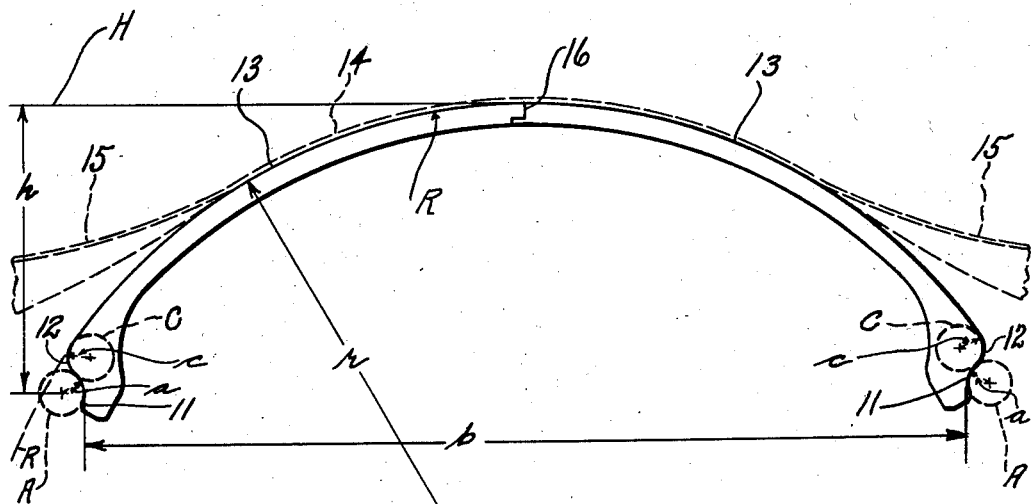
Fig. 2 is a sectional view, on a larger scale, substantially on line 2—2 of Fig. 1.

The drums now in use have proved unsatisfactory for the construction of tires having a very large cross-section in comparison with their bead diameter, such for example as a 7.50/17. In tires of this character the excessive skirt of the carcass plies can be condensed and shaped to the conventional semi-flat drums only with the greatest difficulty if at all. I have overcome these difficulties by so shaping the drum surface, as later explained, that the work of condensing the skirts of the plies is greatly facilitated, and the change of cord positions in the subsequent expanding of the tire to tire shape is so graduated that excessive cord movement does not take place, although no complete shaping of the carcass above the beads while the carcass is on the drum is resorted to.

Referring to the drawing, the drum generally, indicated at 10, is provided with concave, widely spaced bead positioning grooves or seats 11, having a radius $a$, the distance between the bead seats being indicated at $b$. Immediately above the bead grooves 11 the drum surface is curved outwardly, upwardly, and then inwardly to form bead hinge portions or shoulders 12. The portions 12 in sectional profile are preferably circular arcs of a radius $c$. The values of $a$ and $c$ will vary with the bead construction used and will be determined for a given drum by the preferred practice of bead construction with respect to the character, number, and size of the nonextensible elements incorporated in the bead and the position of the bead hinge of the finished tire. By bead hinge is meant the zone in which the stiffness of the bead construction is graduated into the flexibility of the carcass. In the drawing the crown height is indicated by the line H, parallel to a line drawn through the bead positions and spaced therefrom a distance $h$ which is the measure of the crown height of the drum.

In laying out the drum of my invention, circles A of predetermined radius $a$ are drawn with their centers spaced the predetermined distance $b$ plus $2a$ and circles C of predetermined radius $c$ are drawn all in accord with the desired tire size and bead construction. The line H is laid out to give the desired crown height. The profile of the intermediate portion of the building surface of the drum is then constructed by drawing a circular arc tangent to circles C and to line H, by well known methods, the arc R having a mathematically determined radius $r$. The result is a drum profile providing bead seats 11, shoulder portions 12 for shaping the tire up to the bead hinge and an intermediate portion 13 extending between said shoulder portions in a single circular arc.

With a drum constructed as above described, the stretched band of carcass material contracts over the central part of the portion 13, as indicated diagrammatically in dotted lines at 14, the cords tending to change their angle in accordance with the decrease in diameter. Due to the arcuate profile of the drum, the mechanical shaping and contracting of the free skirt portion 15 (shown in dotted line) to the remaining portions of the drum are merely a gradual continuation of the shaping and contraction which automatically takes place in the portion 14, the degree of angle change increasing constantly but uniformly as the shoulder portions are approached; the work of mechanically shaping the carcass material to the drum being greatly facilitated by the initial automatic contraction and the substantially uniform increase in degree of angle change to the shoulder portions 12.

Figure 3:
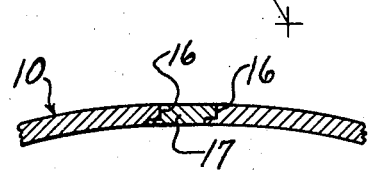
Fig. 3 is a sectional detail showing the manner of effecting adjustment of the drum for a limited range of tire sizes.

Within reasonable limits tires of the same bead diameter but of larger cross-section can be accommodated on a given drum by cutting the drum circumferentially at its crown as indicated at 16, to permit insertion of spacing members 17, as shown in Fig. 3, the width of members 17 being such as to bring distance $b$ to the desired value.

It will be understood that the drum is cut transversely, as at 18 in Fig. 1, into segments to permit collapsing of the drum in accordance with approved practice.

Having thus described my invention, I claim:

1. An annular tire building drum of the semi-flat type having widely spaced bead receiving grooves, curved shoulder portions positioned above the bead receiving grooves for shaping the tire carcass adjacent the bead hinges, and an intermediate portion extending between said shoulder portions in a single circular arc tangent to the curve of the shoulder portions and tangent to the line defining the maximum crown height of the drum.

2. An annular tire building drum of the semi-flat type having widely spaced bead receiving grooves, outwardly curved shoulder portions, arcuate in cross-section, positioned above the bead receiving grooves for shaping the tire carcass adjacent the bead hinges, and an intermediate portion extending between said shoulder portions in a single circular arc tangent to the arcs of the shoulder portions and tangent to the line defining the maximum crown height of the drum.

ARTHUR E. BENSON.